United States Patent
Aker et al.

(10) Patent No.: US 7,510,797 B2
(45) Date of Patent: Mar. 31, 2009

(54) HIGH CAPACITY BATTERY WITH INTEGRALLY-POWERED COOLING ASSEMBLY

(75) Inventors: John F. Aker, Earlysville, VA (US); James R. Wade, Barboursville, VA (US)

(73) Assignee: Aker Wade Power Technologies, LLC, Charlottesville, VA (US)

( * ) Notice: Subject to any disclaimer, the term of this patent is extended or adjusted under 35 U.S.C. 154(b) by 609 days.

(21) Appl. No.: 11/065,313

(22) Filed: Feb. 24, 2005

(65) Prior Publication Data

US 2006/0188776 A1 Aug. 24, 2006

(51) Int. Cl.
  *H01M 10/50* (2006.01)
(52) U.S. Cl. .......................... 429/120; 429/50
(58) Field of Classification Search ............ 429/62, 429/71, 120, 148, 26; 180/68.5; 320/107, 320/109, 150, 154; *H01M 2/02, 10/50*
See application file for complete search history.

(56) References Cited

U.S. PATENT DOCUMENTS

| | | | |
|---|---|---|---|
| 5,015,545 A * | 5/1991 | Brooks | 429/99 |
| 5,320,190 A | 6/1994 | Naumann et al. | |
| 5,577,747 A | 11/1996 | Ogawa et al. | |
| 5,647,450 A | 7/1997 | Ogawa et al. | |
| 5,937,664 A | 8/1999 | Matsuno et al. | |
| 6,094,927 A | 8/2000 | Anazawa et al. | |
| 6,188,574 B1 * | 2/2001 | Anazawa | 361/695 |
| 6,220,383 B1 | 4/2001 | Muraki et al. | |
| 6,433,509 B2 | 8/2002 | Kobayashi et al. | |
| 6,512,347 B1 | 1/2003 | Hellmann et al. | |
| 6,541,151 B2 | 4/2003 | Minamiura et al. | |
| 6,549,014 B1 | 4/2003 | Kutkut et al. | |
| 7,112,387 B2 * | 9/2006 | Kimoto et al. | 429/99 |
| 7,150,935 B2 * | 12/2006 | Hamada et al. | 429/71 |
| 2002/0005216 A1 | 1/2002 | Oravetz et al. | |
| 2002/0043413 A1 | 4/2002 | Kimishima et al. | |

(Continued)

FOREIGN PATENT DOCUMENTS

JP  2000133217 A * 5/2000

(Continued)

OTHER PUBLICATIONS

Linden, D.; Reedy, T.B., Handbook of Batteries, McGraw-Hill, 3rd edition, Appendix A, pp. A8.*

*Primary Examiner*—Susy N Tsang-Foster
*Assistant Examiner*—Katherine Turner
(74) *Attorney, Agent, or Firm*—Vincent K. Gustafson; Intellectual Property/Technology Law

(57) ABSTRACT

A high capacity battery including terminals on a terminal-bearing face thereof, and a plate member coupled in spaced-apart relationship to the terminal-bearing face to define a coolant gas flow space therebetween including a peripheral gap for coolant gas communication with an exterior environment of the battery. One or more motive coolant gas drivers is mounted on the plate member and arranged for effecting flow of coolant gas through the coolant gas flow space and the peripheral gap, and the motive coolant gas drivers are electrically coupled with the terminal-bearing face for powering of such drivers. Such high capacity battery can be substituted for a conventional battery in a battery-powered apparatus such as a forklift vehicle, to provide extended use operation as a result of the on-board thermal management capability of the battery.

20 Claims, 3 Drawing Sheets

U.S. PATENT DOCUMENTS

| | | |
|---|---|---|
| 2002/0102454 A1 | 8/2002 | Zhou et al. |
| 2002/0177035 A1 | 11/2002 | Oweis et al. |
| 2002/0195237 A1 | 12/2002 | Luz et al. |
| 2003/0082438 A1 | 5/2003 | Kwon |
| 2003/0118891 A1 | 6/2003 | Saito et al. |
| 2004/0058233 A1* | 3/2004 | Hamada et al. ............ 429/159 |
| 2004/0065491 A1 | 4/2004 | Dudley et al. |
| 2004/0100225 A1 | 5/2004 | Neil et al. |
| 2004/0108150 A1 | 6/2004 | Guidry et al. |
| 2004/0135550 A1 | 7/2004 | Nishihata et al. |
| 2004/0180257 A1 | 9/2004 | Kimoto |
| 2004/0194489 A1 | 10/2004 | Pode |

FOREIGN PATENT DOCUMENTS

JP         2005216533 A  *  8/2005

* cited by examiner

HIGH CAPACITY BATTERY WITH INTEGRALLY-POWERED COOLING ASSEMBLY

BACKGROUND OF THE INVENTION

1. Field of the Invention

This invention pertains to high capacity batteries suitable for fast charging, and more specifically to a high capacity battery including an integrally-powered cooling assembly, for maintaining optimal efficiency in normal power supply operation, as well as in a fast charging mode.

2. Description of the Related Art

In the use of batteries as power supplies for vehicles, monitoring and surveillance installations, portable signage, temporary lighting units, and other applications, rechargeable high capacity batteries capable of being reenergized by fast charging have assumed increasing importance, due to their efficiency and their minimal down-time for recharging.

"High capacity batteries" as used herein refers to batteries of greater than about 100 Amp-hours capacity.

"Fast charging" as used herein refers to charging a battery at a rate of greater than 30 amperes per 100 ampere-hours of battery capacity. A goal of fast charging is to bring the state of charge ("SOC") of a battery from 30% to 80% of full charge in less than about 1.5 hours.

U.S. Pat. No. 6,803,746 issued Oct. 12, 2004 in the names of the present inventors for "FAST CHARGER FOR HIGH CAPACITY BATTERIES," describes high-efficiency fast chargers for fast charging of high-capacity batteries. The disclosure of such patent is hereby incorporated herein by reference, for all purposes.

As disclosed in the background section of such patent, conventional battery chargers typically operate at charging rates that are about or below 20 amperes per 100 ampere-hours of battery capacity. In consequence, the charging rate of such conventional battery chargers decreases early in the charge cycle, and 8-12 hours are required to restore the battery to full charge status.

The fast charger apparatus and method disclosed in U.S. Pat. No. 6,803,746 overcomes the deficiencies of conventional charging approaches, and permits high capacity lead-acid batteries to be safely charged at higher currents, in a highly effective manner, bringing batteries from 30% to 80% state of charge in about an hour. The charging enabled by the fast charging system of U.S. Pat. No. 6,803,746 is on the order of 400% faster than conventional charging technologies.

By such high-rate, high-efficiency charging afforded by the fast charging system described in U.S. Pat. No. 6,803,746, it is possible to operate fleets of battery-powered vehicles without changing out batteries, thereby obviating the time, effort and lost productivity costs of such change-outs. The fast charging system of U.S. Pat. No. 6,803,746 thereby permits a substantial increase in fleet productivity for such electric battery-powered vehicles. As a result, a typical operation requires at least 50% fewer batteries, in addition to the power savings realized by such systems.

In operation, high capacity batteries entail unique thermal management issues. During heavy duty operation of the power-consuming vehicle or installation, involving a substantial flow of electrochemically generated current, the high capacity battery "runs hot" and the temperature of the battery may rise as much as 20-30° F. or even more.

Additionally, the high-rate intensive charging enabled by the apparatus and method disclosed in U.S. Pat. No. 6,803,746, together with the accompanying continuous use of the high capacity battery that is enabled by such fast charging capability, e.g., with high capacity batteries used to power forklift vehicles in a heavy two or three shift operation without traditional "cool down" periods (which take place when batteries are changed out in prior conventional practice, and the out-changed batteries are put on conventional "slow charger" units overnight for recharging), produces substantial increases in battery temperature during the fast charging operation. This in turn requires charging current to be reduced during late-stage fast charging, in order to maintain battery temperature at a safe level to achieve desired battery life.

This occurrence of substantial increases in battery temperature during fast charging and heavy use applications has a number of adverse effects. Higher battery temperatures result in reduced battery life potentially causing warranty issues with the battery, as well as increasing operating expenses and cost-of-ownership (COO) of the battery-powered vehicle or installation. Further, where the battery (e.g., in a battery box or other mounted arrangement) is located in close proximity to an operator of a battery-powered vehicle or installation, the waste heat generated may adversely impact the operator, with consequent reduction of safety and desirability of the battery-powered operation. In addition, substantial increases in battery temperature undesirably impacts the fast charging operation by increasing the time required for a battery to achieve a targeted state of charge. As a result, the potential benefits inherent in fast charging are not fully realized.

SUMMARY OF THE INVENTION

The present invention relates generally to high capacity batteries suitable for fast charging, and more specifically to a high capacity battery including an integrally-powered cooling assembly, for maintaining optimal efficiency in normal power supply operation, as well as in a fast charging mode.

In one aspect, the invention relates to a high capacity battery including: terminals on a terminal-bearing face thereof; a plate member coupled in spaced-apart relationship to the terminal-bearing face to define a coolant gas flow space therebetween including a peripheral gap for coolant gas communication with an exterior environment of the battery; and one or more motive coolant gas drivers mounted on the plate member and arranged for effecting flow of coolant gas through the coolant gas flow space and the peripheral gap, wherein the motive coolant gas drivers are electrically coupled with the terminal-bearing face for powering of the motive coolant gas drivers.

In another aspect, the invention relates to a method of thermally managing a battery-powered apparatus, including use therein of such a high capacity battery.

Yet another aspect of the invention relates to a method of cooling a high capacity battery, including: coupling a plate member in spaced-apart relationship to a terminal-bearing face of the battery to define a coolant gas flow space therebetween including a peripheral gap for coolant gas communication with an exterior environment of the battery; mounting one or more motive coolant gas drivers on the plate member to effect flow of coolant gas through the coolant gas flow space and the peripheral gap; and electrically coupling the motive coolant gas drivers with the terminal-bearing face for powering of the motive coolant gas drivers.

DETAILED DESCRIPTION OF THE INVENTION, AND PREFERED EMBODIMENTS THEREOF

Figure 1:
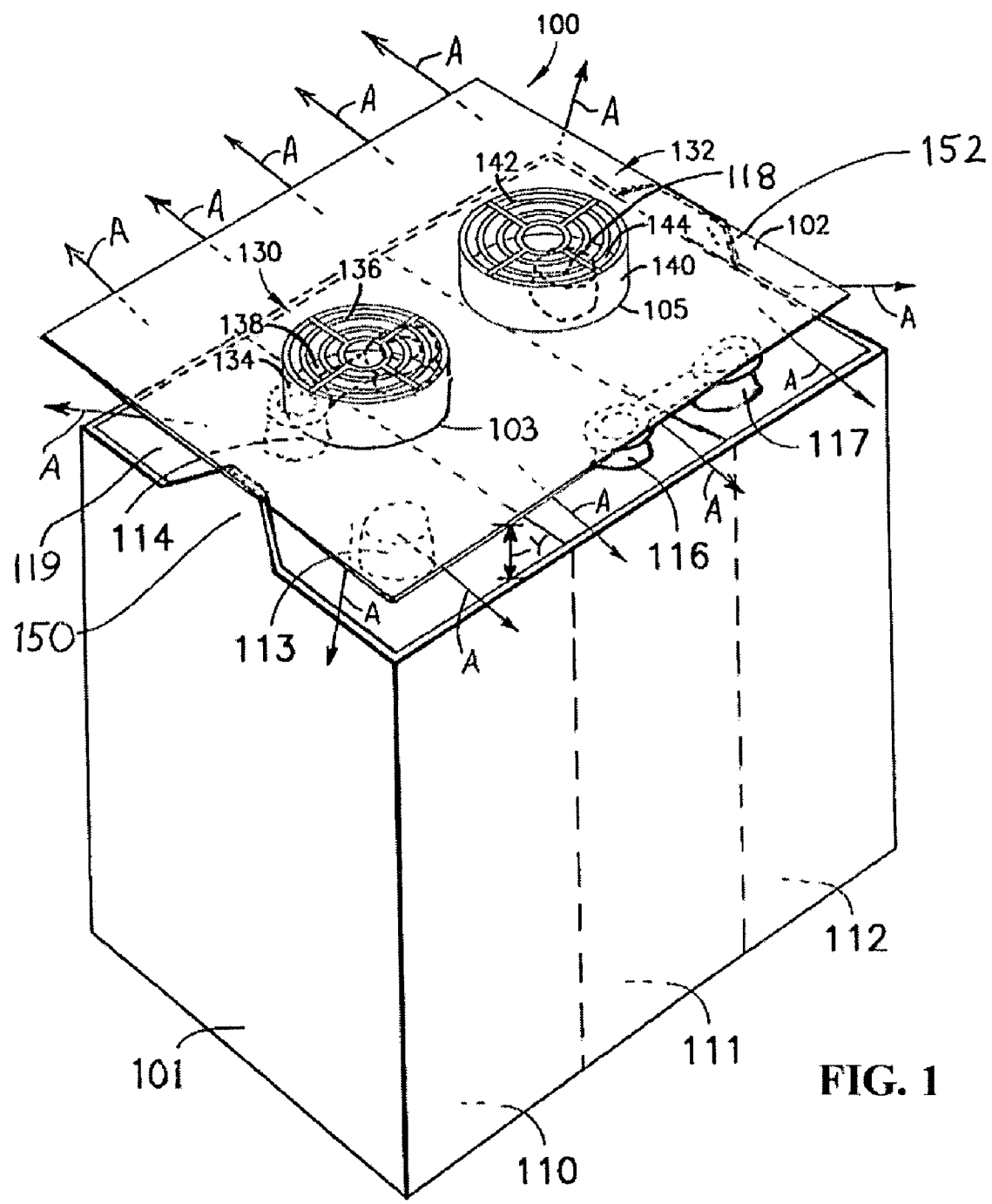
FIG. 1 is a perspective view of a high capacity battery including an integrally-powered cooling assembly, according to one embodiment of the invention.

The present invention relates generally to high capacity batteries suitable for fast charging, and more specifically to a high capacity battery including an integrally-powered cooling assembly, for maintaining optimal efficiency in normal power supply operation, as well as in a fast charging mode.

The present invention reflects the discovery that adverse thermal effects, as incident to fast charging and subsequent heavy use operation of high-capacity batteries without allowance for the customary cool down period, can be efficiently ameliorated by forced-air cooling in a high capacity battery constructed with a plate member secured to the battery casing, overlying and in spaced relationship to the face of the battery including its terminals, thereby forming a gap between the plate member and the face of the battery including its terminals, with the plate member having one or more forced air (or other coolant gas) drivers mounted thereon and arranged to flow air over the terminals, and wherein the forced air drivers are powered by the high capacity battery.

In all instances, a forced-air driver is employed to motively drive coaling air or other coolant gas in a directional manner, so that the battery can be cooled during the fast-charging operation, and optionally, during normal in-service operation. An arrangement with down-draft fans is particularly advantageous, since cooling air thereby is directed onto the terminals and terminal straps of the battery assembly, to maximize the heat transfer gradient and dissipate heat generated by the battery. In lieu of fans, any other motive drivers for cooling air may be employed, such as blowers, compressors, eductors, turbines, ejectors, etc. in the ensuing description of the invention, the forced gas cooling drivers will be discussed as being constituted by fans, although it will be appreciated that the invention can be practiced with other types of motive gas drivers.

The motive gas drivers, e.g., fan(s), mounted on the plate member are arranged so that air flows over the face of the battery including its terminals, with air flowing through the gap between the plate member and the face of the battery overlaid by the plate member, so that there is a continuing flow of cooling air over the face of the battery including its terminals.

In one preferred embodiment of the invention, the plate member has a multiplicity of downdraft fans mounted thereon, so that air drawn from the ambient environment into the space between the plate member and associated face of the battery, and exits at the gap. The plate member in such preferred embodiment is coextensive in area with the face of the battery bearing the terminals, so that the gap is at the peripheral edges of the plate member and the face of the battery in spaced relationship to the plate member.

The plate member may be disposed in spaced relationship to the face of the battery bearing the terminals, by any suitable structural arrangement, e.g., by the provision of spacer elements between the terminals-bearing face and the plate member, such as posts, columns, gaskets, plugs or the like, or by securing the plate member to an upper extremity of a wall extension member of a wall of the casing of the battery, as hereinafter shown in illustrative detail, or in any other suitable manner that produces a spaced-apart plate member in relation to the face of the battery bearing its terminals.

When spacers or casing wall extension portions are employed, the plate member can be secured to the spacer or wall extension portion in any suitable manner, e.g., by means of mechanical fasteners, adhesives, bondants, welding, brazing, mechanical interlocking arrangements, etc. In like manner, the spacers when employed as a means of disposing the plate member in a spaced-apart relationship to the terminal-bearing face of the battery may be secured to the battery face in any suitable manner, e.g., by means of mechanical fasteners, adhesives, bondants, welding, brazing, mechanical interlocking arrangements, integral formation (of the spacer elements with the battery housing, e.g., as a unitary molded structure), or in any other suitable manner.

The plate member can be formed of any suitable material of construction, e.g., of a material including polymer, metal, cellulosic material, ceramic, glass, wood, graphite, composites, etc. The plate member in one embodiment of the invention is formed of a transparent material, such as glass or a clear plastic material such as those available under the trademarks PLEXIGLASS® poly(methyl methacrylate) polymer, LEXAN polycarbonate resin thermoplastic, or ULTEM® polyimide thermoplastic resin, whereby the face of the battery bearing its terminals can be readily visually seen, for ease of inspection and maintenance.

The fan(s) mounted on the plate member may be of any suitable type, and are motively powered by the battery itself, e.g., by a wiring harness, router, bus bar, or other electrical delivery element(s), in which the electrical delivery element(s) are electrically coupled with terminals of the battery and with the fan(s) so that the fans are energized and driven by the battery power.

The fan(s) can be mounted on the plate member in any suitable fashion. For example, the plate member can have one or more openings in which the fan(s) are mounted. The fans can be mounted in, at, above or below the openings, as may be desired in a given application of the invention. For example, the fan housing can be mounted in the opening, so that the housing extends above and below the plate member. As another example, the plate member can have one or more arrays of openings, e.g., in the form of a grid or matrix of openings, with a fan unit overlying each such array, so that air is flowed downwardly through the grid or matrix of openings, and passes over the terminals and associated face of the battery.

The fans can be downdraft fans, or alternatively updraft or exhaust fans, or of any other suitable type, which effects the flow of coolant air or other gas through the space between the plate member and the terminal(s)-bearing face of the battery, for convective cooling of the battery, and removal of heat from such space. If the fans are updraft fans, the mode of operation involves flow of coolant air or other gas through the gap between the plate member and the terminal(s)-bearing face of the battery, into the space between them, and exhaust of gas through the updraft fans to the exterior environment of the battery.

The spacing dimension between the plate member and the face of the battery bearing the battery terminals can be selected without undue effort within the skill of the art, based on the disclosure herein, to effect the desired character of cooling of the battery to dissipate waste heat therefrom, and maintain battery temperature in a selected range or thermal regime.

The spacing dimension will be based on considerations including the height and size of terminals on the terminal-bearing face of the battery being cooled, the size and dimensional characteristics of the fan(s) utilized for cooling the battery, as well as the rating and duty characteristics of the fan(s), the dimensional characteristics and arrangement of the electrical delivery element(s) that are employed to conduct power from the battery to the fan(s). The plate member should therefore be spaced from the associated terminal-bearing face of the battery by a distance that provides sufficient clearance of the plate member from the structure on the associated battery face, e.g., upwardly extending terminals, wire loops of power cords to the fan(s), etc., so that sufficient flow of coolant gas through the space between the plate member and associated battery face is achieved to maintain the desired cooling action on the battery.

In various embodiments, the spacing distance, as measured vertically, where the terminal-bearing face of the battery is a horizontally arranged top surface of the battery, and the plate member is parallel to such top face of the battery, i.e., in a horizontal plane that is spaced from and parallel to the top face of the battery, can be on the order of about 1 to about 4 inches (about 2.54 to about 10.16 centimeters), although other spacing dimensions may be employed to good result in other embodiments within the scope of the invention, consistent with the foregoing discussion of the heat transfer operation.

Thus, the spacing dimension between the plate member and the terminal-bearing face of the battery can be widely varied in the broad practice of the present invention.

The present invention thus embodies a unitary modular battery including integral cooling capability, which avoids the necessity of externally supplied cooling means and infrastructure. This is an important advantage, since in many instances where high capacity batteries are employed, there is an existing vehicle or installation that would otherwise have to be modified, both structurally and operationally, to provide cooling equivalent to what is provided "on-board" the battery in the power supply unit of the present invention.

Accordingly, the battery of the present invention represents a "drop-in" battery replacement for existing batteries in applications where existing equipment does not have to be modified or adapted to provide cooling, particularly where fast charging of the battery is involved, and necessitates some thermal management intervention to maintain battery temperature in a desired thermal regime. Because no modification of the battery-powered equipment is necessary, the battery of the present invention, as a drop-in replacement for existing conventional high capacity batteries, is highly cost-effective and convenient.

For example, in application to a battery-powered forklift vehicle, the integrally cooled battery of the present invention can be simply substituted for a conventional high-capacity battery, in a straightforward fashion, with no loss of functionality or service life. In this respect, it has been surprisingly and unexpectedly found that the on-board fan(s) of the integrally cooled battery of the invention, despite the expected shortening of the battery active use period before charging is required as a result of the power draw of the fan(s), in fact has an active use period that is greater than the active use period of a corresponding conventional battery lacking the integral cooling capability, as a consequence of the increased efficiency of the battery resulting from cooling.

The battery of the invention may be additionally provided with switch or actuation elements, for actuating the operation of the fan(s), and for shutting off the fan(s), so that the fans may be selectively operated as desired during active power-supplying use and/or during charging of the battery. This feature may be desirable from the standpoint of operation of the battery in a time-varying climate or environment, e.g., in a forklift that operates intermittently outdoors in low winter temperatures, and indoors in a heated warehouse environment, so that cooling is selectively provided when needed or desired.

Referring now to the drawings, FIG. 1 is a perspective view of a high capacity lead-acid battery 100 including an integrally-powered cooling assembly, according to one embodiment of the invention.

The battery 100 includes a lead-acid battery array in casing 101 having side wall extensions 150 and 152 to which is secured a plate member 102 equipped with a dual-fan system for thermal management during fast charging and/or active power supply use of the battery.

As illustrated, the lead-acid battery 100 includes battery cells 110, 111 and 112 whose output terminals include terminals 113, 114 (which is strapped to another output terminal obscured by fan 138 in the drawing), 116, 117 and 118. Respective lead battery straps interconnect terminal 114 and the terminal obscured by fan 138 in the drawing, and terminals 116 and 117.

In accordance with the invention, the battery is constructed to accommodate flow of cooling air in a way that enhances the dissipation of heat from the terminals and interconnecting straps of the battery assembly.

The battery multi-cell assembly is disposed beneath a plate member 102, on which the fan assemblies 130 and 132 are mounted to downwardly direct air onto the battery cells in the battery for cooling thereof, to prevent undue heat build-up in the battery.

The fan assembly 130 includes a cylindrical collar 134 disposed in opening 103 in plate member 102. An overlying protective grate member 136 is mounted at the top open end of the collar member 134. A fan 138 is mounted in the interior of the collar 134, and arranged for effecting down-flow of air drawing from the ambient environment through the grate member 136.

In like manner, the fan assembly 132 includes a cylindrical collar member 140 mounted in opening 105 in plate member 102. A protective grate member 142 is mounted to overlie the upper open end of the collar member 140. A fan 144 is mounted in the collar member 140 to effect down-flow of air drawn from the ambient environment through grate member 142 onto the underlying battery cells.

As illustrated, the plate member 102 is secured to the upper edge surfaces of the wall extension portions 150 and 152 of the battery casing 101. Such securement may be effected by ultrasonic welding of the plate member 102 to the upper edge surfaces of the wall extension portions, or alternatively by adhesive bonding, mechanical fastening, mechanical interlocking, or in other suitable manner.

By such arrangement of the plate member and battery casing, the plate member is in spaced-apart relationship to the top face of the battery, bearing the terminals 113, 114, 116, 117, and 118, being separated therefrom by a vertical distance Y as shown. The plate member thereby forms with the casing and top face of the battery a gap 119 around the periphery of the plate member and top edge of the battery casing (excluding the wall extension portions of the casing).

In cooling operation of the battery, air from the ambient environment of the battery is flowed downwardly through the fans 138 and 144 and into the space between plate member 102 and the terminal-bearing top face of the battery, flowing over such face and the terminals and terminal straps thereon, and egressing from such space at the peripheral gap 119, in the direction indicated by the arrows A.

In the use of the battery assembly shown in FIG. 1, fast charging is carried out when the state of charge of the battery cells 110, 111, and 112 has declined as a result of their operational use, to a predetermined low level. The battery assembly once it reaches the predetermined low level is connected to a fast charging system (not shown in FIG. 1), to recharge the battery cells 110, 111, and 112 to a predetermined high state of charge, for resumption of normal in-service operation. Alternatively, the fast charging may be initiated after a predetermined in-service period of time has elapsed, as part of a fixed schedule of charging and in-service operation.

During the fast charging operation, the fast charger apparatus is suitably coupled with terminals 113 and 118 of the battery assembly. The fast charger employed in such fast charging operation may be of any suitable type, e.g., a fast charging apparatus of the type shown and described in our U.S. Pat. No. 6,803,746 issued Oct. 12, 2004.

During the fast charging operation, the fans 138 and 144 of respective fan assemblies 130 and 132 operate to drive air downwardly from the ambient environment, for flow over the terminals and associated straps of the battery assembly, and subsequently away from the battery assembly, as continuing flow displaces air from the location of the battery assembly, e.g., by lateral outward flow at the peripheral gap 119 between the plate member 102 and the top face of the battery.

In such manner, the forced down-flow of air during the fast charging cooling operation and in subsequent heavy use operation provides a flux of cooling air to dissipate heat from the battery in a highly effective manner.

As mentioned, the fans 138 and 144 may be actuated not only during the fast charging operation, but also during normal in-service operation of the battery, e.g., in an intermittent or continuous manner, as appropriate in a given application of the invention. For such purpose, the battery may have associated therewith a thermocouple, thermistor, thermostat or other temperature-monitoring element that is coupled to the battery and power delivery means and/or switches associated with the fans 138 and 144, so that the fans are actuated during normal in-service operation when temperature at or in the vicinity of the battery reaches a predetermined level. Alternatively, the fans may be arranged for continuous operation, at all times during which the battery is actively being discharged in use. For this purpose, load sensing or current draw monitoring circuitry may be employed, to switch on the fans during active in-service operation of the battery.

The battery shown in FIG. 1 provides a thermally regulated power supply that may be installed in or otherwise associated with any suitable battery-powered vehicle or installation.

The thermal management system of the battery in the FIG. 1 embodiment thus includes a forced-air driver arranged for directional flow of cooling air over the battery to dissipate heat generated by the battery in a highly efficient manner, so that the battery is cooled as needed during its active power-supplying use and during fast charging.

Figure 2:
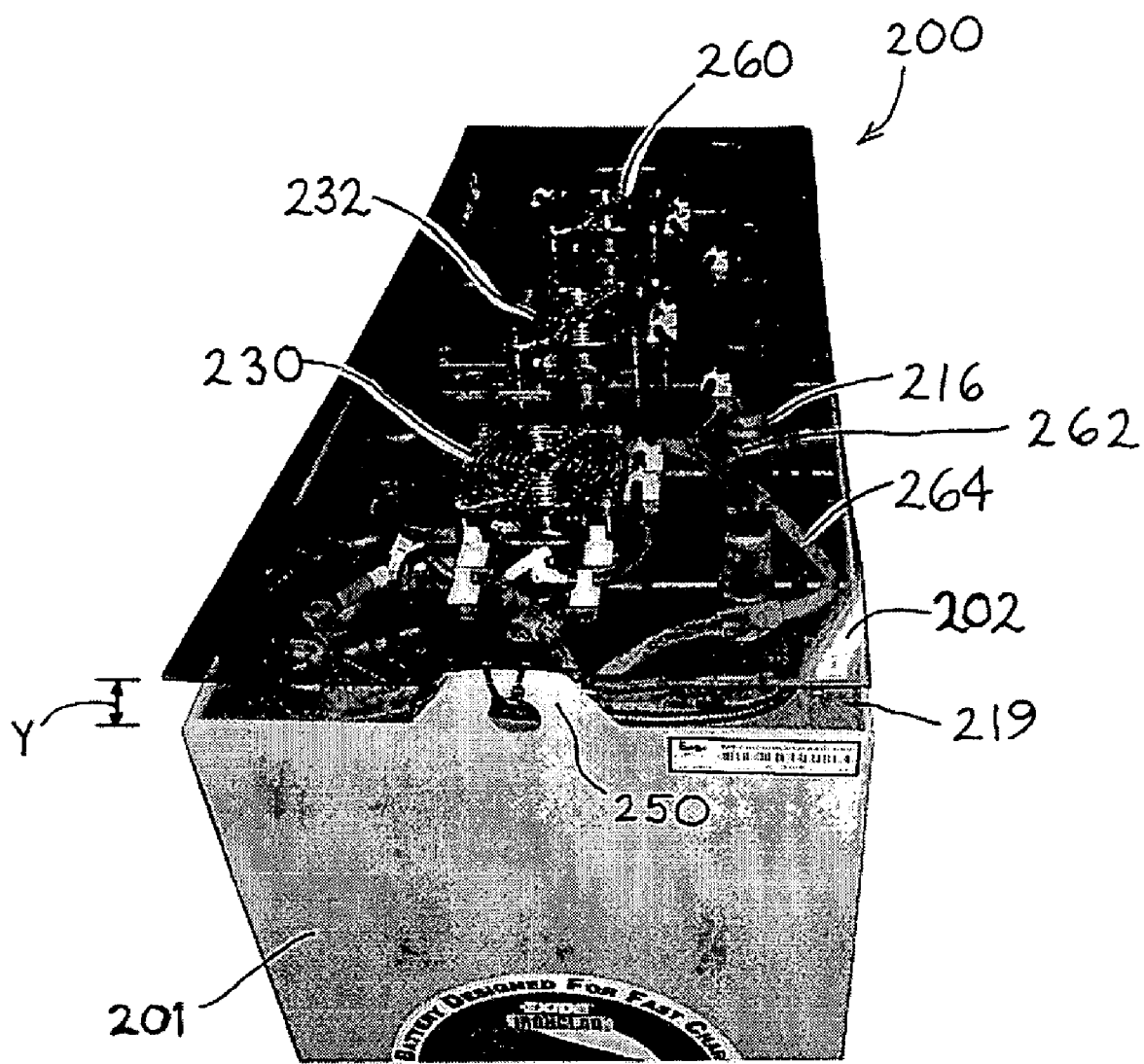
FIG. 2 is a front perspective view of a high capacity battery including an integrally-powered cooling assembly, according to another embodiment of the invention.

FIG. 2 is a front perspective view of a high capacity battery 200 including an integrally-powered cooling assembly, according to another embodiment of the invention.

The battery 200 includes battery casing 201 containing multiple cells featuring terminals 216 and connecting straps 262 arranged for the battery to supply power when it is electrically coupled with suitable power delivery circuitry and load.

The battery includes end walls each of which has a wall extension portion 250, on the upper edges of which is secured a plate member 202 having openings therein mounting downdraft fans 230, 232 and 260, as illustrated. The plate member 202 thereby is arranged in spaced-apart relationship to the top terminal-bearing face of the battery, to provide a gap 219 therebetween of vertical spacing dimension Y for egress of cooling air from between the plate member and top face of the battery.

The fans 230, 232 and 260 in the FIG. 2 embodiment are arranged with a wiring harness 264 interconnecting the fans in powered relationship to the cells of the battery, with the wiring harness coupled to terminals in a series or other electrical arrangement providing power from the battery to the fans for operation of the latter to cool the battery.

Figure 3:
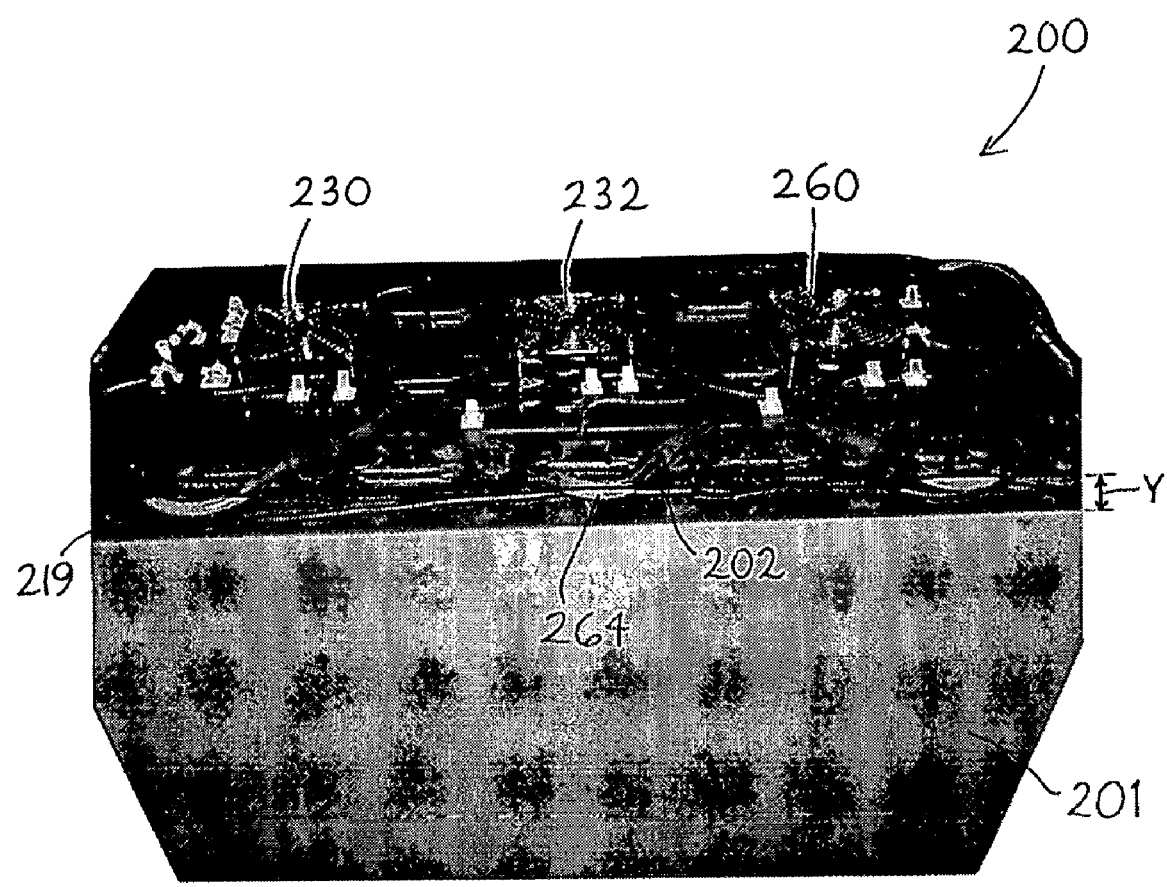
FIG. 3 is a side perspective view of the high capacity battery of FIG. 2, further showing the details thereof.

FIG. 3 is a side perspective view of the high capacity battery 200 of FIG. 2, further showing the details thereof. In the FIG. 3 drawing, all parts and components are numbered correspondingly to the numbering of the same parts and components in FIG. 2. FIG. 3 shows the arrangement of the wiring harness 264, as arranged to power the fans 230, 232 and 260 for cooling of the battery.

It will therefore be appreciated that the unitary modular battery assembly of the invention provides a highly efficient self-cooled power supply unit that can be readily used to replace conventional high capacity batteries, without the necessity of modifying battery-powered equipment. The rechargeable high capacity battery of the invention can be installed in a convenient and effective manner, to enable long in-service periods of powered operation to be achieved before recharging of the high capacity battery is required.

While the invention has been described with respect to particular features, aspects and embodiments, it will be recognized that the invention is not thus limited, but rather extends to and encompasses numerous variations, modifications and alternative embodiments, such as will suggest themselves to those of ordinary skill in the art, based on the disclosure herein.

Accordingly, the invention is intended to be broadly construed and interpreted, as encompassing all such variations, modifications and alternative embodiments, within the spirit and scope of the ensuing claims.

What is claimed is:

1. A high capacity battery including:
   terminals on a terminal-bearing face thereof;
   a plate member coupled in spaced-apart relationship to the terminal-bearing face to define a coolant gas flow space therebetween including a peripheral gap between the plate member and the terminal-bearing face allowing for lateral ingress or egress of coolant gas for coolant gas communication with an exterior environment of the battery;
   one or more motive coolant gas drivers mounted on the plate member and arranged for effecting flow of coolant gas through the coolant gas flow space and the peripheral gap; and
   one or more electrical delivery elements within the coolant gas flow space and electrically coupled between (i) the terminal-bearing face and (ii) the one or more motive coolant gas drivers for powering the motive coolant gas drivers with the battery.

2. The high capacity battery of claim 1, wherein the battery is rechargeable by fast charging.

3. The high capacity battery of claim 1, wherein the battery is a lead-acid battery.

4. The high capacity battery of claim 1, wherein two or more motive coolant gas drivers are mounted on the plate member.

5. The high capacity battery of claim 1, wherein each of the one or more motive coolant gas drivers includes a fan.

6. The high capacity battery of claim 1, wherein the terminal-bearing face and the plate member are parallel to one another.

7. The high capacity battery of claim 1, wherein the plate member and terminal-bearing face are separated by a separation distance of from about 1 inch to about 4 inches.

8. The high capacity battery of claim 1, wherein each of the one or more motive coolant gas drivers includes a down-draft fan.

9. The high capacity battery of claim 1, having a casing including side walls, wherein the plate member is coupled with upper edges of wall extension portions of the side walls.

10. The high capacity battery of claim 1, wherein the plate member is coextensive in area with the terminal-bearing face.

11. The high capacity battery of claim 1, including a multiplicity of battery cells in a casing.

12. The high capacity battery of claim 1, wherein the one or more motive coolant gas drivers include a plurality of downflow fans, and the one or more electrical delivery elements comprises a wiring harness coupled with terminals of the terminal-bearing face.

13. The high capacity battery of claim 1, configured as a drop-in replacement for a battery lacking an integral motive coolant gas driver.

14. A method of thermally managing a battery-powered apparatus including a high capacity battery as claimed in claim 1, the method comprising operating said one or more motive coolant gas drivers to effect flow of coolant gas through the coolant gas flow space and the peripheral gap.

15. The method of claim 14, wherein the high capacity battery is recharged from a depleted state of charge condition to a recharged condition, comprising fast charging, and wherein the motive coolant gas drivers are actuated during fast charging.

16. The method of claim 15, wherein the high capacity battery is not removed from the battery-powered apparatus during fast charging.

17. The method of claim 16, wherein after the fast charging, the battery-powered apparatus is placed in active service operation, and during at least part of the active service operation, the motive coolant gas drivers are actuated.

18. The method of claim 16, wherein the battery-powered apparatus includes a forklift vehicle.

19. A method of cooling a high capacity battery, including:
coupling a plate member in space-apart relationship to a terminal-bearing face of the battery to define a coolant gas flow space therebetween, the coolant gas flow space including a peripheral gap between the plate member and the terminal-bearing face allowing for lateral ingress or egress of coolant gas for coolant gas communication with an exterior environment of the battery;
mounting one or more motive coolant gas drivers on the plate member to effect flow of coolant gas through the coolant gas flow space and the peripheral gap; and
electrically coupling the motive coolant gas drivers with the terminal-bearing face using one or more electrical delivery elements within the coolant gas flow space, for powering of the motive coolant gas drivers with the battery.

20. The method of claim 19, wherein the one or more motive coolant gas drivers include a plurality of downflow fans, and a wiring harness coupled with terminals of the terminal-bearing face.

* * * * *